United States Patent [19]

Van Walraven

[11] Patent Number: 5,647,564
[45] Date of Patent: Jul. 15, 1997

[54] METHOD FOR FASTENING A PIPE IN A VERTICAL POSITION TO A WALL

[75] Inventor: Jan Van Walraven, Mijdrecht, Netherlands

[73] Assignee: J. van Walraven B.V., Mijdrecht, Netherlands

[21] Appl. No.: 662,960

[22] Filed: Jun. 13, 1996

Related U.S. Application Data

[63] Continuation of Ser. No. 211,517, filed as PCT/NL93/00166, Aug. 5, 1993, abandoned.

[30] Foreign Application Priority Data

Aug. 5, 1992 [NL] Netherlands ............................ 9201410
Mar. 23, 1993 [NL] Netherlands ............................ 9300521

[51] Int. Cl.$^6$ ............................................... F16L 3/08
[52] U.S. Cl. ............................ 248/74.2; 248/60; 248/74.3
[58] Field of Search ............................. 248/74.2, 74.1, 248/74.3, 60, 62, 65, 231.91

[56] References Cited

U.S. PATENT DOCUMENTS

| | | | |
|---|---|---|---|
| 2,447,830 | 8/1948 | Wood | 248/54 |
| 2,881,997 | 4/1959 | McMahan, Sr. | 248/56 |
| 3,856,245 | 12/1974 | Byerly | 248/54 |
| 3,998,477 | 12/1976 | Delahaye et al. | 285/93 |

FOREIGN PATENT DOCUMENTS

| | | | |
|---|---|---|---|
| 0413883 | 2/1991 | European Pat. Off. | 248/74.1 |
| 0508085 | 2/1992 | European Pat. Off. | |
| 0512654 | 11/1992 | European Pat. Off. | 248/62 |
| 582354 | 2/1994 | European Pat. Off. | 248/74.1 |
| 3130272 | 2/1983 | Germany | 248/74.1 |
| 3522497 | 1/1987 | Germany | 248/62 |
| 4228961 | 3/1994 | Germany | 248/74.2 |
| 0007239 | of 1885 | United Kingdom | 248/74.1 |

*Primary Examiner*—Ramon O. Ramirez
*Assistant Examiner*—Anita M. King
*Attorney, Agent, or Firm*—Thomas R. Vigil

[57] ABSTRACT

A method for fastening a pipe to a wall in a substantially vertical position and in a shock and sound absorbing manner, comprising the steps of: fastening a generally circular pipe support body to the supporting wall, selecting the size of the support body so as to allow the pipe to be slidably surrounded by the body without being contacted by it; providing the pipe with a fixed collar and placing the pipe substantially coaxially within the support body and with a sound absorbing liner interposed between the upwardly facing edge formation of the support body and the collar, characterized by the use of a pipe support body in the form of a pipe clip of a type formed of a metal strip and that is provided—at its inner circumferential surface facing towards the pipe—with a shock and sound absorbing liner of an elastomeric material, the liner having an edge portion that engages the upwardly facing edge of the clip body strip and is integrally formed with the shock and sound absorbing liner, the latter being in the shape of flexible projections which extend axially and upwardly from the edge portion and having a length which is in the order of twice its thickness.

2 Claims, 2 Drawing Sheets

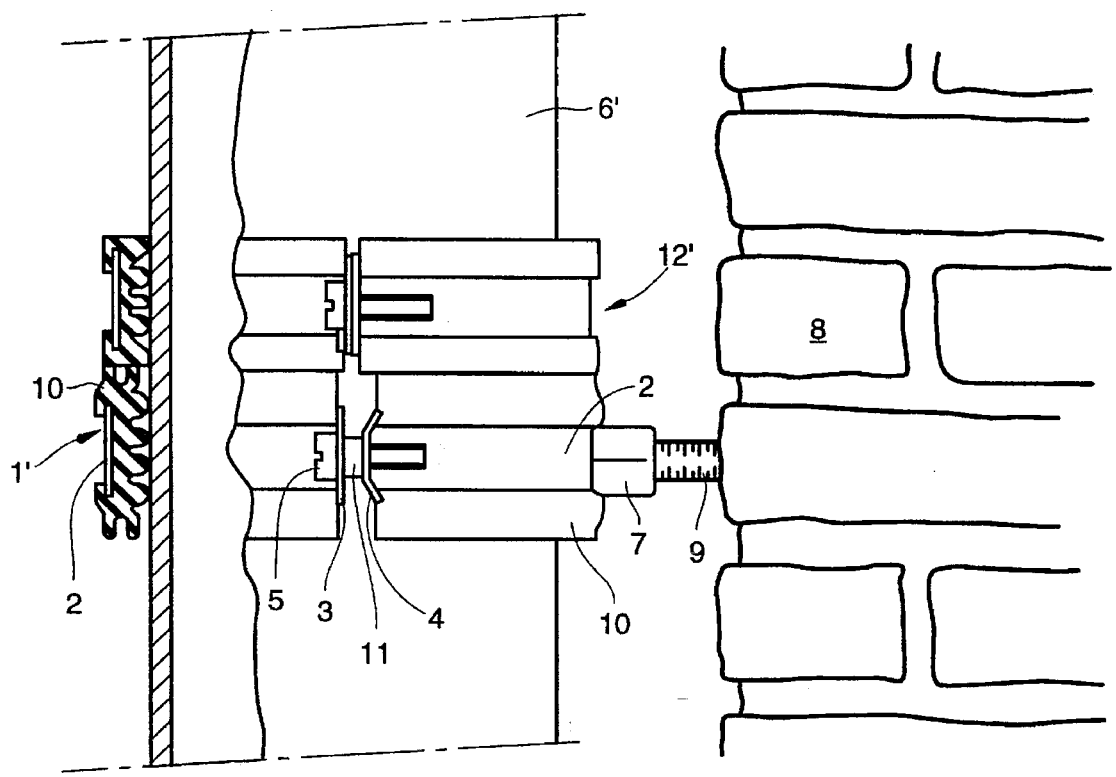
FIG. 2
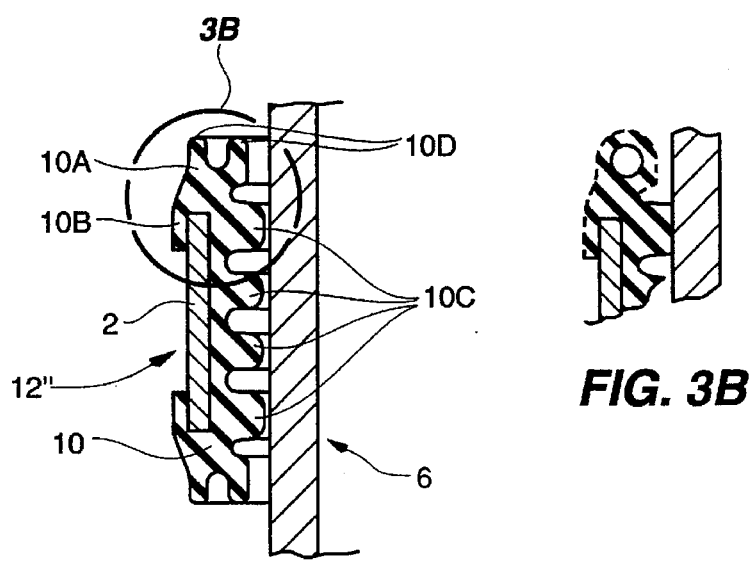
FIG. 3A
FIG. 3B

METHOD FOR FASTENING A PIPE IN A VERTICAL POSITION TO A WALL

This is a continuation of application Ser. No. 08/211,517, filed as PCT/NL93/00166, Aug. 5, 1993, now abandoned.

The invention relates to a method for fastening a pipe to a wall in a substantially vertical position, wherein a pipe clip provided with a shock absorbing liner is applied around the pipe and fastened to the supporting wall.

When suspending pipes or conduits in a rather vertical position to a wall, such as fall pipes for rainwater and similar pipes to vertical walls of buildings such pipes are usually suspended at a certain distance from the wall by means of a pipe clip that is provided with a shock absorbing liner, said pipe clip being usually screwed—by means of a nut welded to it—onto the free end of a threaded rod or the like extending from the support wall. The fastening has to be such, that the pipe is prevented from sinking through the fastening clip by gravity. Therefore up to now the fastening clip has been clamped around the pipe rather fixedly. As a result of this the liner is compressed between pipe and pipe clip to an extent, that the absorbing effect of the liner with respect to (sound) vibrations within the pipe (which may e.g. caused by rainwater flowing therethrough) becomes insufficient. The sound connected with the water falling through the pipe may then easily penetrate through the pipe fastening into the space behind the respective supporting wall.

The present invention aims at providing a solution for this problem, which solution is characterized in that the pipe is loosely received within the fastening clip and that the pipe is supported—by means of a collar that is unslidably provided on it—onto the upwardly facing edge of the fastening clip with the intermediary of a shock absorbing element.

In this manner the absorbing function of the liner of the fastening clip attached to the wall may come out completely, whereas on the other hand a shock absorbing support of the pipe is obtained on the upper edge of the fastening clip by which it is loosely surrounded.

The surrounding function and the spacer and guiding function of the fastening clip have become separated, so that it is no longer necessary to fixedly clamp the clip with its liner about the pipe.

In a preferred embodiment a second, similar pipe clip, which remains free from the supporting wall, is clamped around the pipe to function as a support collar.

The invention also relates to a liner for a pipe clip, of the type comprising a strip of flexible rubber material or similar elastomeric material, having along at least one of its longitudinal edges an upstanding edge portion adapted to engage about an edge of the circular body of the pipe clip.

Such liners are usually applied in cases, where the pipe or conduit to be fastened, mostly in a horizontal position, has to be suspended from a wall in a rather vibration- or shockfree manner. Examples of pipe clips provided with such liners are shown in EP-A-0188649, EP-A-0387966 and DE-A-37 08 065.

The liner is often provided with projections or ribs, which are to engage either the inner side of the (usually metallic) pipe clip (vide EP-A-0387966) or the surface of the pipe or conduit to be suspended (vide DE-A-34 39 418) and may contribute to the vibration- or shock-absorbing capability of the liner. The damping of vibrations or shocks by the liner will of course be more effective when the clamping of the lining around the pipe or conduit is less tight.

Therefore it is also an object of the invention to improve a liner of the above type in such a way that, when it is used with a clip for fastening a vertical pipe, it may also function as a vibration-cushioning support for a support collar to be applied about the pipe.

In accordance with the invention this aim is achieved in that the liner is provided with projections which extend laterally outwardly from the upstanding edge portion.

When using a pipe-clip equipped with a liner thus formed for the suspending of a vertical pipe or conduit the projections provided in accordance with the invention will become facing upwardly so that they function as a vibration-damping basis for a support ring or flange (to be) provided around the pipe to be suspended.

In a practical embodiment two parallel and mutually spaced ribs are provided to form the said projections.

In a preferred embodiment the two circumferentially extending ribs are interconnected to form a hollow profile.

Further features and advantages of the invention will be hereinafter further explained by way of two examples with reference to the drawing.

FIG. 2 shows a modification of the embodiment of FIG. 1;

FIG. 3 is a cross-section on an enlarged scale of the liner used with the pipe fastening according to FIG. 1 and 2.

Figure 1:
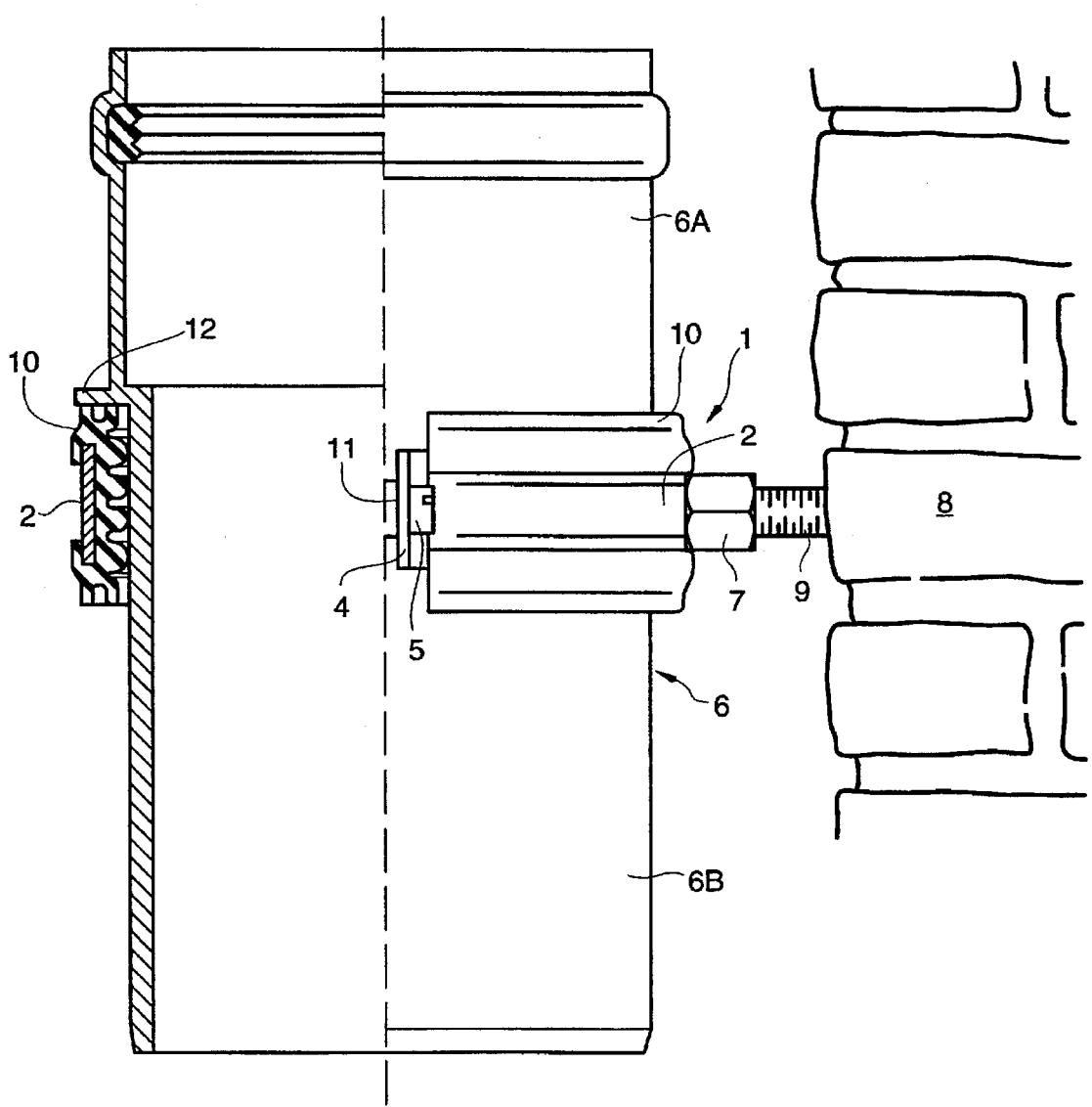
FIG. 1 shows a pipe clip fastened to a wall in accordance with the invention, together with a pipe section carried by it, one half being shown in a side elevational view and the other half being shown in longitudinal section.

With reference to the drawing 1 is a pipe clip of a well-known type per se. The fastening clip has an annular clip body 2 which is usually formed of metal and the flanged ends 3, 4 (shown to the front) of which may be tightened by means of a clamping screw 5 so as to clamp the clip more or less tightly around the pipe 6 to be suspended.

The annular clip body 2 often consists of two halfs, which in the example shown are hingedly connected behind the pipe 6. A second flange connection at that location, however, is also possible.

On the outer side of (one of the two parts of) the clip body 2 a nut 7 is provided as by welding, by means of which the clip is threadingly engaged on the end of a threaded rod 9 that is attached to the supporting wall 8.

The pipe clip 1 is provided with a liner 10 which extends along the inner circumferential surface of the clip body. This liner, an enlarged cross-section of which is shown in FIG. 3, consists in a well-known manner of a strip of flexible rubber or the like. This rubber strip engages the edges of the clip body 2 through upstanding and inwardly projecting longitudinal edge portions 10a and 10b respectively; furthermore it is provided, at its face turned towards the pipe to be suspended, with ribs 10c which circumferentially extend in the assembled state.

The liner 10 also comprises outwardly extending projections 10d which extend radially from the upstanding edge portions 10a and are formed—in the example shown—by two spaced ribs. The thickness of these ribs substantially corresponds with that of the easily flexing inwardly projecting edge portions 10b, whereas the height of the ribs is in the order of twice the rib thickness.

The fastening clip 1 equipped with the liner as described hereinabove is applied about the pipe 6 (which may be formed of e.g. plastics material) rather "loosely", i.e. not tight enough to prevent the pipe from sliding through the clip downwardly under gravity. Generally speaking there is hardly any contact between the ribs 10c and the pipe 6. In order to secure such a loose enclosure of the pipe 6 a filling washer 11 may be provided between the flanges 3 and 4, as known per se from EP-A-0387966.

Yet the suspended pipe is locked in place, i.e. is prevented from sinking through the clip, by having the ribs 10d, which in use are facing upwardly, function as an annular bearing for a supporting rim or flange 12 that is fixedly connected about the pipe 6. Tests have shown that with a (fall) pipe suspended in the above manner a surprisingly good sound damping effect is obtained from the liner according to the invention.

In the example of FIG. 1 the collar 12 is integrally formed with the pipe 6. In fact FIG. 1 shows a connecting socket with a support flange integrally formed therewith and formed of a plastic material that is typical for this type of pipes. The flange 12 is formed at the transition between an upper socket portion 6a adapted to receive an upper pipe section and a lower spigot portion 6b adapted to be inserted in a lower pipe section.

In FIG. 2 a normal, continuous fall pipe is shown, around which pipe clips of a well-known type are fixedly clamped at radially spaced locations to function as supporting rim or collar 12' and to remain free from the wall. The clip body of such a fastening clip may have the same size of that of the pipe clip 1. However, no use is made of a filling washer 11 when clamping the clip' around the pipe 6'. It is an advantage of this second embodiment that the pipe to be suspended may initially positioned relative to the supporting wall in the horizontal direction, while being loosely enclosed by the clips attaching the pipe to the wall the pipe is then positioned in the height direction and finally the clips 12' are applied about the pipe and rigidly clamped. This avoids the need of determining the exact fastening locations in advance.

The projections 10d, which contribute to the vibration damping effect of the liner 10, may be united to a rounded hollow profile, such as indicated by the dash lines in FIG. 3. The liner of the auxiliary clip functioning as a support collar 12' could be correspondingly shaped, in which case the two liners would be supported one on the other with the intermediary of two hollow profiles.

I claim:

1. A method for fastening, in a generally vertical position, a pipe to a substantially vertically extending supporting wall in a shock and sound absorbing manner, said method comprising the steps of:

fastening a generally circular pipe support body to the supporting wall;

selecting the size of said support body so as to allow the pipe to be slidably surrounded by said body without being contacted by it;

providing the pipe with a fixed collar and placing the pipe substantially coaxially within said support body and with a sound absorbing means interposed between an upwardly facing edge formation of the support body and said collar;

forming the pipe support body in the shape of a pipe clip of a type formed of a metal strip;

providing said body, at its inner circumferential surface facing towards the pipe, with a shock and sound absorbing liner of an elastomeric material, said liner having an edge portion that engages the upwardly facing edge of the clip body strip and is integrally formed with said shock and sound absorbing means, the latter being in the shape of flexible projections which extend axially and upwardly from said edge portion and having a length which is in the order of twice its thickness; and, providing a second, similar pipe clip, which remains free from the supporting wall and which is clamped around the pipe to function as a collar.

2. A pipe clip having a generally circular body for fastening a pipe to a substantially vertically extending wall, said pipe clip comprising a shock absorbing liner of the type comprising a strip of flexible rubber material or similar elastomeric material, having, along at least one of its longitudinal edges, an upstanding edge portion and a flexible portion extending therefrom inwardly to engage around an edge of said circular body of said pipe clip, projections being provided to extend laterally outwardly (=axially when mounted on a pipe clip) from said upstanding edge portion, said laterally outwardly extending projections having a thickness that substantially corresponds to that of said flexible inwardly extending portion and a length (height) which is in the order of twice said thickness, and two spaced projections of the liner are united to form a hollow profile.

* * * * *